United States Patent
Li et al.

(10) Patent No.: US 11,567,384 B2
(45) Date of Patent: Jan. 31, 2023

(54) NON-LIGHT-EMITTING, VARIABLE TRANSMISSION DEVICE AND A PROCESS OF FABRICATING THE SAME

(71) Applicant: SAGE ELECTROCHROMICS, INC., Farlbault, MN (US)

(72) Inventors: Wen Li, Lakeville, MN (US); Florent Martin, Paris (FR); Jean-Christophe Giron, Edina, MN (US); Robert Newcomb, Minneapolis, MN (US); Erik Jon Bjornard, San Jose, CA (US)

(73) Assignee: SAGE ELECTROCHROMICS, INC., Faribault, MN (US)

( * ) Notice: Subject to any disclaimer, the term of this patent is extended or adjusted under 35 U.S.C. 154(b) by 578 days.

(21) Appl. No.: 16/192,876

(22) Filed: Nov. 16, 2018

(65) Prior Publication Data
US 2019/0155120 A1   May 23, 2019

Related U.S. Application Data

(60) Provisional application No. 62/588,767, filed on Nov. 20, 2017.

(51) Int. Cl.
*G02F 1/155* (2006.01)
*G02F 1/15* (2019.01)
(Continued)

(52) U.S. Cl.
CPC ............ *G02F 1/155* (2013.01); *E06B 3/6612* (2013.01); *G02F 1/15* (2013.01); *G02F 1/1516* (2019.01); *G02F 1/1523* (2013.01); *G02F 1/163* (2013.01)

(58) Field of Classification Search
CPC .......... G02F 1/155; G02F 1/1516; G02F 1/15; G02F 1/1523; G02F 1/163; E06B 3/6612
(Continued)

(56) References Cited

U.S. PATENT DOCUMENTS

| 5,216,536 A | 6/1993 | Agrawal et al. |
| 5,859,722 A | 1/1999 | Suga et al. |

(Continued)

FOREIGN PATENT DOCUMENTS

| JP | H07028099 A | 1/1995 |
| JP | 2014514703 A | 6/2014 |

(Continued)

OTHER PUBLICATIONS

International Search Report from PCT/EP2018/081556 dated Feb. 11, 2019, 2 pgs.

*Primary Examiner* — Marin Pichler
*Assistant Examiner* — Mitchell T Oestreich
(74) *Attorney, Agent, or Firm* — Abel Schillinger, LLP; Robert N Young (57) ABSTRACT

A non-light-emitting, variable transmission device can include a first substrate, a first transparent conductive layer, an electrochromic layer, a second transparent conductive layer, a second substrate; and an interlayer disposed between the first substrate and the second substrate. The non-light-emitting, variable transmission device is configured such that a failure of the non-light-emitting, variable transmission device is less likely than another non-light-emitting, variable transmission device in which the interlayer directly contacts the second transparent conductive layer and has a moisture content of at least 0.08 wt %. In an embodiment, the interlayer has a moisture content of at most 0.05 wt %. In another embodiment, the non-light emitting, variable transmission device further includes a barrier layer disposed between the second transparent conductive layer and the interlayer, wherein the barrier layer extends at least partly through the second transparent conductive layer or seals off a passageway.

17 Claims, 5 Drawing Sheets

(51) Int. Cl.
*E06B 3/66* (2006.01)
*G02F 1/1516* (2019.01)
*G02F 1/1523* (2019.01)
*G02F 1/163* (2006.01)

(58) Field of Classification Search
USPC .......................................................... 359/265
See application file for complete search history.

(56) References Cited

U.S. PATENT DOCUMENTS

| | | | |
|---|---|---|---|
| 5,995,271 A * | 11/1999 | Zieba | G02F 1/153 359/275 |
| 9,193,135 B2 | 11/2015 | Boote et al. | |
| 2003/0219632 A1 | 11/2003 | Schaepkens | |
| 2006/0066803 A1 | 3/2006 | Aylward et al. | |
| 2009/0067031 A1 | 3/2009 | Piroux et al. | |
| 2012/0033287 A1 | 2/2012 | Friedman et al. | |
| 2012/0258295 A1* | 10/2012 | Leyder | G02B 1/10 428/212 |
| 2013/0312341 A1 | 11/2013 | Gy et al. | |
| 2014/0022621 A1* | 1/2014 | Kailasam | H01J 37/3429 118/704 |
| 2015/0362817 A1 | 12/2015 | Patterson et al. | |
| 2016/0141258 A1 | 5/2016 | Jain et al. | |
| 2017/0003566 A1 | 1/2017 | Friedman et al. | |

FOREIGN PATENT DOCUMENTS

| | | |
|---|---|---|
| WO | 2016100403 A1 | 6/2016 |
| WO | 2016154064 A1 | 9/2016 |

* cited by examiner

NON-LIGHT-EMITTING, VARIABLE TRANSMISSION DEVICE AND A PROCESS OF FABRICATING THE SAME

CROSS-REFERENCE TO RELATED APPLICATION

This Application claims priority under 35 U.S.C. § 119(e) to U.S. Provisional Application No. 62/588,767 entitled "NON-LIGHT-EMITTING, VARIABLE TRANSMISSION DEVICE AND A PROCESS OF FABRICATING THE SAME," by Wen Li et al., filed Nov. 20, 2017, which is assigned to the current assignee hereof and is incorporated herein by reference in its entirety.

BACKGROUND

Field of the Disclosure

The present disclosure is directed to non-light-emitting, variable transmission devices and processes of forming the same.

Related Art

A non-light-emitting, variable transmission device can include an electrochromic layer disposed between two glass sheets. The electrochromic layer is deposited over one of the glass sheets, and an interlayer is used to join a combination of the glass sheet and electrochromic layer to the other glass sheet. The defects can be formed during the fabrication processes and reduce yield, form an electrical short, affect the appearance of the device (e.g., non-uniform tinting), or reduce the operational lifetime of the device. Further improvement in fabricating non-light-emitting, variable transmission devices is desired.

BRIEF DESCRIPTION OF THE DRAWINGS

Embodiments are illustrated by way of example and are not limited in the accompanying figures.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

The use of the word "about", "approximately", or "substantially" is intended to mean that a value of a parameter is close to a stated value or position. However, minor differences may prevent the values or positions from being exactly as stated. Thus, differences of up to ten percent (10%) for the value are reasonable differences from the ideal goal of exactly as described.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the glass, vapor deposition, and electrochromic arts.

A non-light-emitting, variable transmission can be fabricated with a reduced likelihood of a defect that reduces yield, forms an electrical short, affects the appearance of the device, or reduces the operational lifetime of the device. A non-light-emitting, variable transmission device can include a first substrate, a first transparent conductive layer overlying the first substrate, an electrochromic layer overlying the first transparent conductive layer, a second transparent conductive layer overlying the electrochromic layer, a second substrate, and an interlayer disposed between the first substrate and the second substrate. The non-light-emitting, variable transmission device can be configured such that a failure of the non-light-emitting, variable transmission device related to the interlayer is less likely than another non-light-emitting, variable transmission device in which the interlayer directly contacts the second transparent conductive layer, and the interlayer has a moisture content of at least 0.08 wt %.

In an embodiment, the interlayer has a moisture content of at most 0.05 wt %. In another embodiment, the non-light emitting, variable transmission device further includes a barrier layer disposed between the second transparent conductive layer and the interlayer, wherein the barrier layer extends at least partly through the second transparent conductive layer.

Embodiments as illustrated in the figures and described below help in understanding particular applications for implementing the concepts as described herein. The embodiments are exemplary and not intended to limit the scope of the appended claims.

Figure 1:
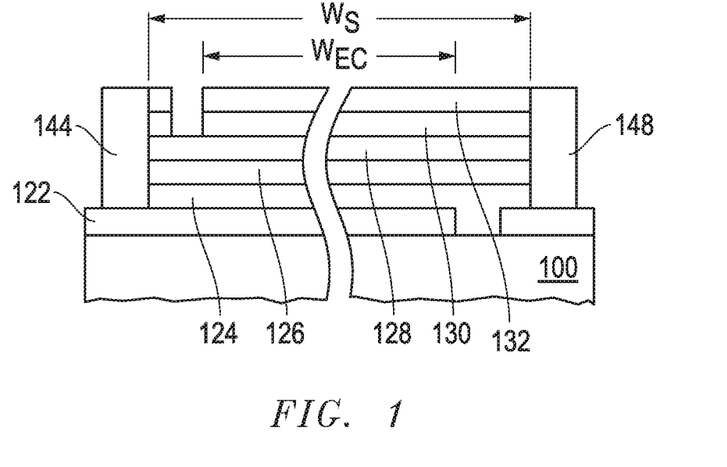
FIG. 1 includes an illustration of a cross-sectional view of portions of a workpiece including an electrochromic substrate, a stack of layers, and bus bars.

FIG. 1 includes a cross-sectional view of a portion of a electrochromic substrate 100, a stack of layers 122, 124, 126, 128, 130, and 132, and bus bars 144 and 148 overlying the electrochromic substrate 100. In an embodiment, the electrochromic substrate 100 can include a glass substrate, a sapphire substrate, an aluminum oxynitride substrate, or a spinel substrate. In another embodiment, the electrochromic substrate 100 can include a transparent polymer, such as a polyacrylic compound, a polyalkene, a polycarbonate, a polyester, a polyether, a polyethylene, a polyimide, a polysulfone, a polysulfide, a polyurethane, a polyvinylacetate, another suitable transparent polymer, or a co-polymer of the foregoing. The electrochromic substrate 100 may or may not be flexible. In a particular embodiment, the electrochromic substrate 100 can be float glass or a borosilicate glass and have a thickness in a range of 0.5 mm to 4 mm thick. In another particular embodiment, the electrochromic substrate 100 can include ultra-thin glass that is a mineral glass having a thickness in a range of 50 microns to 300 microns. In a particular embodiment, the electrochromic substrate 100 may be used for many different non-light-emitting variable transmission devices being formed and may be referred to as a motherboard.

The compositions and thicknesses of the layers are described before describing their formation. Transparent conductive layers 122 and 130 can include a conductive metal oxide or a conductive polymer. Examples can include a tin oxide or a zinc oxide, either of which can be doped with a trivalent element, such as Al, Ga, In, or the like, a fluorinated tin oxide, or a sulfonated polymer, such as polyaniline, polypyrrole, poly(3,4-ethylenedioxythiophene), or the like. In another embodiment, the transparent conductive layers 122 and 130 can include gold, silver, copper, nickel, aluminum, or any combination thereof. The transparent conductive layers 122 and 130 can have the same or different compositions and the same or different thicknesses.

The set of layers includes an electrochromic stack that includes the layers 124, 126, and 128 that are disposed between the transparent conductive layers 122 and 130. The layers 124 and 128 are electrode layers, wherein one of the layers is an electrochromic layer, and the other of the layers is an ion storage layer (also referred to as a counter electrode layer). The electrochromic layer can include an inorganic metal oxide electrochemically active material, such as $WO_3$, $V_2O_5$, $MoO_3$, $Nb_2O_5$, $TiO_2$, CuO, $Ir_2O_3$, $Cr_2O_3$, $Co_2O_3$, $Mn_2O_3$, or any combination thereof and have a thickness in a range of 50 nm to 2000 nm. The ion storage layer can include any of the materials listed with respect to the electrochromic layer or $Ta_2O_5$, $ZrO_2$, $HfO_2$, $Sb_2O_3$, or any combination thereof, and may further include nickel oxide (NiO, $Ni_2O_3$, or combination of the two), and Li, Na, H, or another ion and have a thickness in a range of 80 nm to 500 nm. An ion conductive layer 126 (also referred to as an electrolyte layer) is disposed between the electrode layers 124 and 128, and has a thickness in a range of 20 microns to 60 microns. The ion conductive layer 126 allows ions to migrate therethrough and does not allow a significant number of electrons to pass therethrough. The ion conductive layer 126 can include a silicate with or without lithium, aluminum, zirconium, phosphorus, boron; a borate with or without lithium; a tantalum oxide with or without lithium; a lanthanide-based material with or without lithium; another lithium-based ceramic material; or the like. The ion conductive layer 126 is optional and, when present, may be formed by deposition or, after depositing the other layers, reacting portions of two different layers, such as the electrode layers 124 and 128, to form the ion conductive layer 126. After reading this specification, skilled artisans will appreciate that other compositions and thicknesses for the layers 122, 124, 126, 128, and 130 can be used without departing from the scope of the concepts described herein.

An optional antireflective layer 132 is disposed over the upper transparent conductive layer 130 and can be used to help reduce reflection. The antireflective layer 132 can have an index of refraction between the underlying layers (refractive index of the underlying layers can be approximately 2.0) and clean, dry air or an inert gas, such as Ar or $N_2$ (many gases have refractive indices of approximately 1.0). In an embodiment, the antireflective layer 132 has a refractive index in a range of 1.4 to 1.6. The antireflective layer 132 can include an insulating material having a suitable refractive index. In a particular embodiment, the antireflective layer 132 includes silica. The thickness of the antireflective layer 132 is selected to be thin and provide the sufficient antireflective properties. The thickness for the antireflective layer can depend at least in part on the refractive index of the set of layers. The thickness of the antireflective layer 132 can be in a range of 20 nm to 100 nm.

The layers 122, 124, 126, 128, 130, and 132 can be formed over the electrochromic substrate 100 with or without any intervening patterning steps, breaking vacuum, or exposing an intermediate layer to air before all the layers are formed. In an embodiment, the layers 122, 124, 126, 128, 130, and 132 can be serially deposited. The layers 122, 124, 126, 128, 130, and 132 may be formed using physical vapor deposition or chemical vapor deposition. In a particular embodiment, the layers 122, 124, 126, 128, 130, and 132 are sputter deposited.

In the embodiment illustrated in FIG. 1, each of the transparent conductive layers 122 and 130 include portions removed, so that the bus bars 144 and 148 are not electrically connected to each other. Such removed portions are typically 20 nm to 2000 nm wide. In a particular embodiment, the bus bar 144 is electrically connected to the electrode layer 124 via the transparent conductive layer 122, and the bus bar 148 is electrically connected to the electrode layer 128 via the transparent conductive layer 130. The bus bars 144 and 148 include a conductive material. In an embodiment, each of the bus bars 144 and 148 can be formed using a conductive ink, such as a silver frit, that is printed over the transparent conductive layer 122. In another embodiment, one or both of the bus bars 144 and 148 can include a metal-filled polymer. In a particular embodiment (not illustrated), the bus bar 148 is a non-penetrating bus bar that can include the metal-filled polymer that is over the transparent conductive layer 130 and spaced apart from the layers 122, 124, 126, and 128. The viscosity of the precursor for the metal-filled polymer may be sufficiently high enough to keep the precursor from flowing through cracks or other microscopic defects in the underlying layers that might be otherwise problematic for the conductive ink. The lower transparent conductive layer 122 does not need to be patterned in this particular embodiment. In still another embodiment, the bus bars 144 and 148 may be in the form of a conductive tape that is applied to the workpiece instead of printing the bus bars.

In the embodiment illustrated, the width of the non-light-emitting variable transmission device $W_{EC}$ is a dimension that corresponds to the lateral distance between the removed portions of the transparent conductive layers 122 and 130. $W_{EC}$ corresponds to one of the planar dimensions of the tintable area of the non-light-emitting variable transmission device. $W_S$ is the width of the stack between the bus bars 144 and 148. The difference in $W_S$ and $W_{EC}$ is at most 5 cm, at most 2 cm, or at most 0.9 cm. Thus, most of the width of the stack corresponds to the operational part of the non-light-emitting variable transmission device that allows for different transmission states. In an embodiment, such operational part is the main body of the non-light-emitting variable transmission device and can occupy at least 90%, at least 95%, at least 98% or more of the area between the bus bars 144 and 148.

Figure 2:
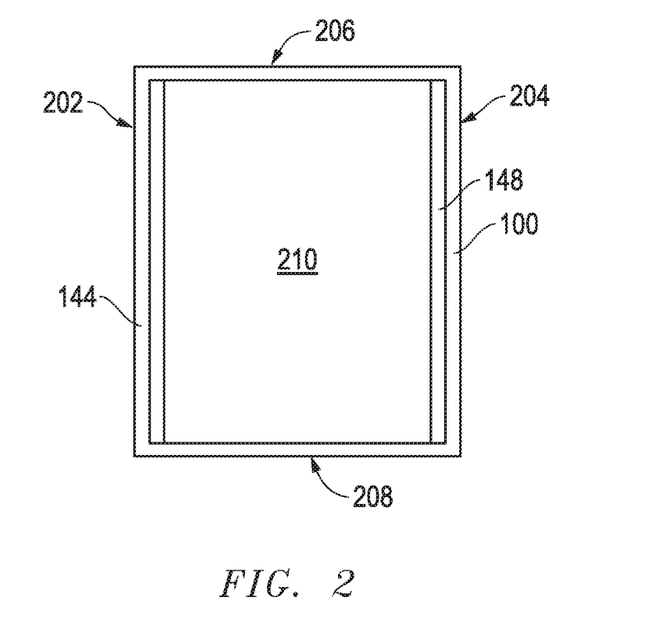
FIG. 2 includes an illustration of a top view of the workpiece of FIG. 1 to provide a better understanding of positional relationships between components in FIG. 1.

FIG. 2 includes a top view of the electrochromic substrate 100 and a non-light-emitting variable transmission device 210 that includes the layers as described with respect to FIG. 1. The bus bar 144 lies along a side 202 of the electrochromic substrate 100, and the bus bar 148 lies along a side 204 that is opposite the side 202. Each of the bus bars 144 and 148 has a length that extends a majority of the distance between sides 206 and 208. In a particular embodiment, each of the bus bars 144 and 148 has a length that is at least 75%, at least 90%, or at least 95% of the distance between the sides 206 and 208. The lengths of the bus bars 144 and 148 are substantially parallel to each other. As used herein, substantially parallel is intended to means that the lengths of the bus bars 144 and 148 are within 10 degrees of being parallel to each other. Along the length, each of the bus bars 144 and 148 has a substantially uniform cross-sectional area and composition. Thus, in such an embodiment, the bus bars 144 and 148 have a substantially constant resistance per unit length along their respective lengths.

During fabrication or later in the process, a void may be formed that extends through one or more of the layers. As will be described in more detail later in this specification, an interlayer between the electrochromic substrate 100 and a cover glass substrate may cause problems with the non-light-emitting, variable transmission device. The description below is related to a particular way in which a void in one or more of the layers may be formed. The description provides a better understanding of how a void or a passageway (e.g., a gap, interconnected set of openings, or the like) may be formed. After reading this specification, skilled artisans will appreciate that the void or the passageway may be formed in other different ways and at other locations within the non-light-emitting, variable transmission device.

Although not desired, particles may be introduced into the device. In a particular embodiment, after forming the lower transparent conductive layer 122, the electrochromic substrate 100 and the lower transparent conductive layer 122 may be removed from a deposition tool, so that the lower transparent conductive layer 122 may be patterned. After patterning, the electrochromic substrate 100 and lower transparent conductive layer 122 can be placing into the same deposition tool or a different deposition tool.

Figure 3:
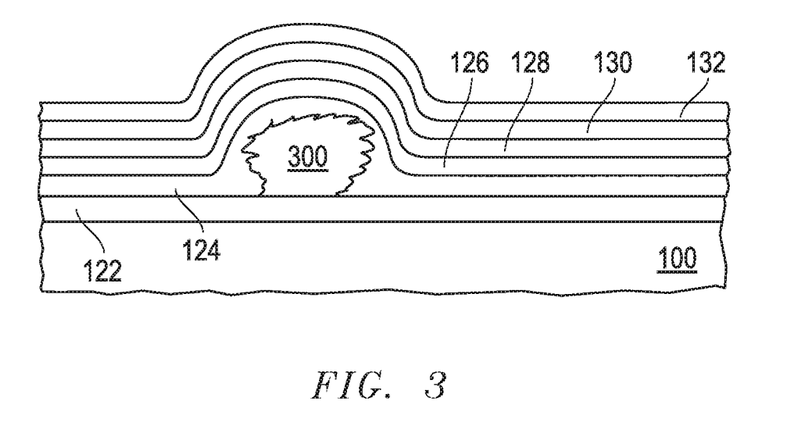
FIG. 3 includes an illustration of a cross-sectional view of a portion of a workpiece illustrating a particle formed between layers.

Referring to FIG. 3, a particle 300 may be present on the lower transparent conductive layer 122 before depositing the remaining layers in the stack. The particle 300 may be from the patterning sequence, from a substrate handling tool, from a coating on a deposition chamber or door that breaks away during transferring the substrate into or out of the deposition tool or during a pump down or back fill cycle, or the like. The other layers can be deposited over the lower transparent conductive layer 122 and the particle 300 as illustrated in FIG. 3. In another embodiment, the particle 300 may be introduced at a different time may be located between any of the other layers or between the electrochromic substrate 100 and the lower conductive layer 122.

Figure 4:
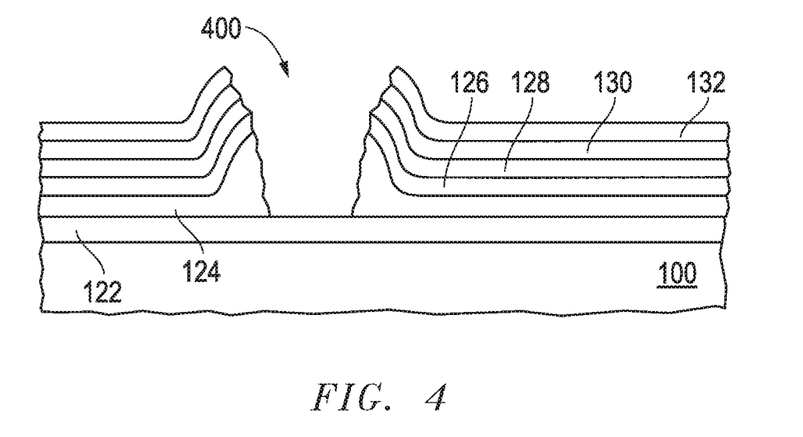
FIG. 4 includes an illustration of a cross-sectional view of the workpiece of FIG. 3 after a void is formed after the particle is ejected.

The particle 300 may become ejected to form a void 400, as illustrated in FIG. 4. The void 400 may extend at least through at least the upper transparent conductive layer 130 and possibly one or more other layers. The particle 300 and void 400 may not be visible to human eyes, as the size of the particle 300, the resulting void 400, or both can be less than 50 microns, less than 20 microns, or smaller in width.

In an embodiment, the particle 300 may become ejected by handling, cleaning, laser cutting or other mechanical operations. Alternatively, the particle 300 becomes ejected during testing. In a particular test, the device can be make transitions between a high transmission (also called bleached) state to a low transmission (also called tinted) state, and vice versa. During the electrical testing, an electrical bias may be placed across the bus bars 144 and 148 when transitioning from the high transmission state to the low transmission state, and the electrical bias may be removed when transitioning from the low transmission state to the high transmission state. When biasing or removing the bias, the particle 300 may be ejected.

In another embodiment, one or more of the layers 124, 126, 128, or 130 may fracture or have portions that break away near the particle 300. Such defects may be caused by strain within a layer or stress between layers adjacent to the particle. Even in the particle 300 remains, such defect can create a passageway to open in one or more of the layers adjacent to the particle. The passageway can include a relatively straight path to the lower conductive layer 122 or an interconnected set of micro-openings that form a path with one or more bends. A subsequent layer, such as an interlayer, may flow thru the passageway and reach the lower conductive layer 122.

As will be described in more detail, a barrier layer, an interlayer with a relatively low moisture content, or both can be used to reduce the likelihood of a failure if a conventional interlayer and no barrier layer would be used.

Figure 5:
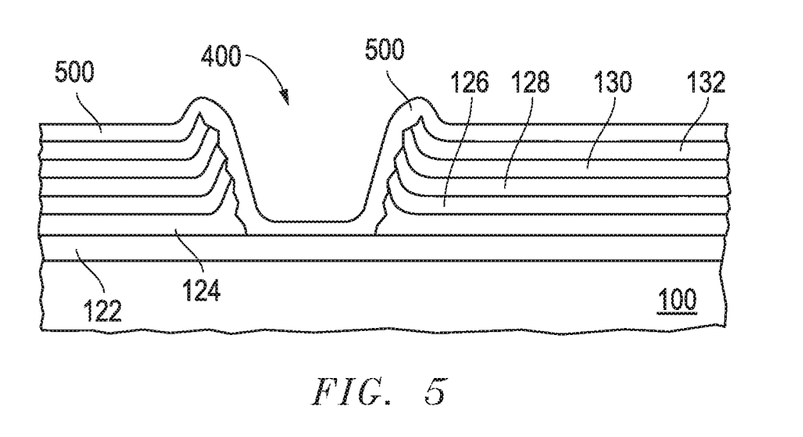
FIG. 5 includes an illustration of a cross-sectional view of the workpiece of FIG. 4 after forming a barrier layer within the void.

In an embodiment, a barrier layer 500 can be formed over the layers and within the void 400, as illustrated in FIG. 5. The barrier layer 500 helps to keep an interlayer from contacting any of the layers exposed within the void 400, such as the upper transparent conductive layer 130. Thus, the barrier layer 500 can be disposed between the upper transparent conductive layer 130 and the interlayer. The barrier layer 500 can extend at least partly through the upper transparent conductive layer 130, and may extend through all or partly through any of the other layers within the set of layers overlying the electrochromic substrate 100. In another embodiment, the barrier layer 500 can extend into or seal off a passageway.

In a particular embodiment, the barrier layer 500 may contact the lower transparent conductive layer 122, as illustrated in FIG. 5. In another embodiment, the interlayer does not contact the lower transparent conductor layer 122 or any layer within the electrochromic stack. In a particular embodiment (not illustrated), the void may have a width such that the barrier layer 500 seals off the void 400, rather than lining the void 400. In a further particular embodiment (not illustrated), the barrier layer 500 may fill 80% or more of the void 400.

The barrier layer 500 can include an electrically insulating layer. The barrier layer 500 can include an oxide, a nitride, or an oxynitride. In a particular embodiment, the barrier layer 500 can include SiOx, SiNx, SiOxNy, AlOx, TiOx, TiNx, TiOxNy, or any combination thereof. For the oxides and nitrides, x can represent a stoichiometric value or a value within 50% of the stoichiometric value, and for the oxynitrides, x and y can be selected to achieve a desired refractive index. In an embodiment, the barrier layer 500 has a thickness of at least 10 nm, at least 12 nm, or at least 15 nm, and in another embodiment, the barrier layer 500 has a thickness of at most 90 nm, at most 70 nm, or at most 50 nm. The barrier layer 500 can be formed using sol gel process, a spin-on coating, atomic layer deposition, or the like. In a particular embodiment, a directional deposition method, such as physical vapor deposition, plasma enhanced chemical vapor deposition, etc.) may not be used, as the interlayer may contact a layer along a sidewall of the void 400.

In a further embodiment, the barrier layer 500 can include alternating films of inorganic and organic materials. The combination of films for the barrier layer 500 can help reduce stress within the barrier layer 500. Furthermore, the films with the organic materials can help to decouple any defect in any film that includes an inorganic material. More particularly, a barrier layer 500 having a single film can have a defect that propagates through the entire thickness of such single film. Thus, propagation of defects through the barrier layer 500 having multiple films is reduced, as defects in the films are less likely to align and result a relatively straight path extending through the thickness of the barrier layer 500.

For the multi-film barrier layer 500, the inorganic material can include any of the materials previously described with respect to the barrier layer 500. The inorganic films within the barrier layer 500 may have the same inorganic material or may have different inorganic materials.

In an embodiment, the organic material can be a polymer. A liquid including the monomer can be flash evaporated, condensed on an exposed surface, and cured using light (such as ultraviolet light) or heat. The polymer can include a polyalkene, a polyester, a polyether, or the like. In a particular embodiment, the polymer can include a parylene, a polyacrylate, another suitable polymer, or the like. In another embodiment, the organic material can include a product of a reaction of ethanolamine and maleic anhydride. In another embodiment, a different organic material can be used. The organic films within the barrier layer 500 may have the same organic material or may have different organic materials.

In a particular embodiment, the film closest to the electrochromic device can be an inorganic film. Such a configuration may be helpful to reduce the likelihood that a film including an organic material contaminates a layer below the barrier layer 500. In another particular embodiment, the film farthest from the electrochromic device can be an inorganic film.

In an embodiment, the number of films within the barrier layer 500 can be at least 3, at least 5, or at least 7. Although there is no known theoretical to the number of films, practical considerations, such as luminous transmission, may limit the number of films. In an embodiment, the number of films is at most 90, at most 30, or at most 20. In an embodiment, each of the films may be formed by molecular layer deposition or atomic layer deposition. The thickness of the films may depend on the number of cycles used to form the film. In an embodiment, each of the films may have a thickness in a range of 0.2 nm to 4 nm.

Figure 6:
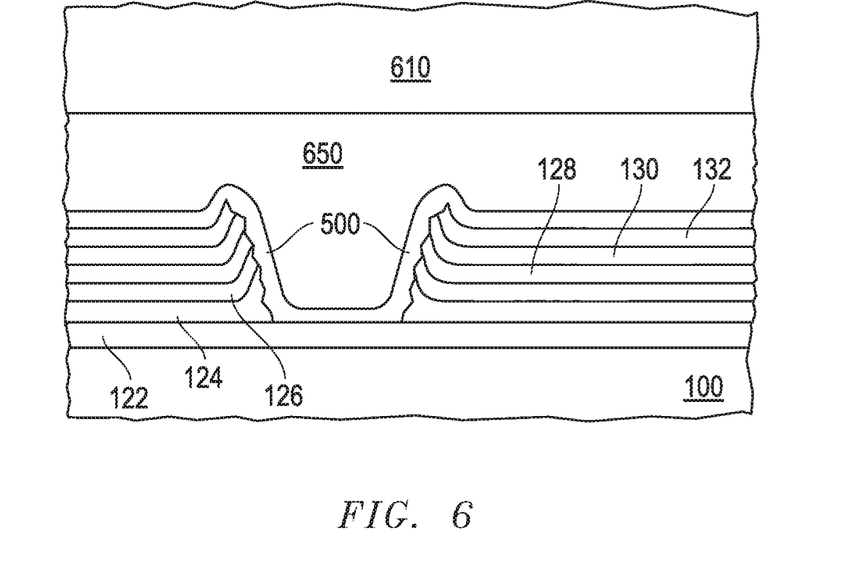
FIG. 6 includes an illustration of a cross-sectional view of the workpiece of FIG. 5 after joining the workpiece to a cover glass substrate.

The workpiece as illustrated in FIG. 5 can be laminated to a cover glass substrate 610 with an interlayer 650, as illustrated in FIG. 6. The cover glass substrate 610 can include any of the materials as previously desired with respect to the electrochromic substrate 100. The cover glass substrate 610 may include chemically or heat tempered glass or toughened glass. The cover glass substrate 610 may lie along an outer surface of an insulated glass unit and may be thicker than the electrochromic substrate 100. The cover glass substrate 610 can have a thickness in a range of 2 mm to 25 mm, and in an embodiment, a thickness in a range of 4 mm to 12 mm. In a particular embodiment, the cover glass substrate 610 includes chemically or heat tempered glass or toughened glass having a thickness in a range of 6 mm to 12 mm. In another particular embodiment, the electrochromic substrate 100 can include annealed glass (annealed to reduce stress, not tempered) and have a thickness of at most 2.2 mm. Thus, the electrochromic substrate 100 is better suited to laser cutting as compared to the cover glass substrate 610.

The interlayer 650 is disposed between the cover glass substrate 610 and the barrier layer 500. The interlayer 650 can be a lamination adhesive. In an embodiment, the interlayer 650 can include a thermoplastic, such as polyurethane, ethylene vinyl acetate (EVA) or polyvinyl butyral (PVB). In this embodiment, the interlayer 650 may have a moisture content of at least 0.05 wt %, such as at least 0.08 wt %. During the lamination process, the interlayer 650 may flow. The barrier layer 500 helps to keep the interlayer 650 from contacting any of the layers exposed along the sidewall of the void 400.

Figure 7:
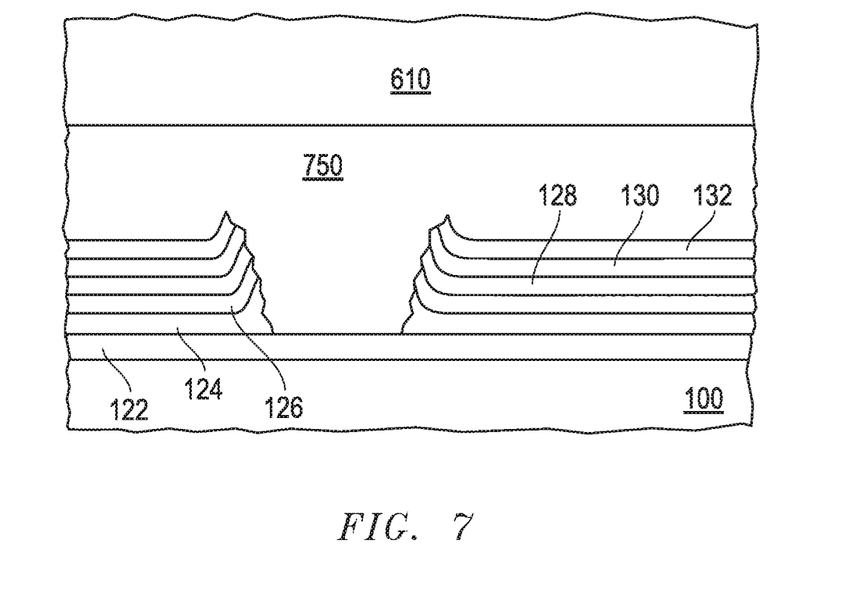
FIG. 7 includes an illustration of a cross-sectional view of the workpiece of FIG. 4 after joining the workpiece to a cover glass substrate using an interlayer as described in accordance with an embodiment.

In another embodiment, the barrier layer 500 is not required. The workpiece as illustrated in FIG. 4 can be laminated to the cover glass substrate 610 with an interlayer 750, as illustrated in FIG. 7. The interlayer 750 is disposed between the cover glass substrate 600 and the layers illustrated in FIG. 4.

The interlayer 750 can be a lamination adhesive. The interlayer 750 has a relatively low moisture content as compared to conventional interlayers. In a particular embodiment, the interlayer 750 has a moisture content of at most 0.05 wt %. The low moisture content of the interlayer 750 can be achieve by placing the interlayer in a closed container with a desiccant; placed in a container substantially free of water vapor, such as clean dry air, $N_2$, $CO_2$, a noble gas, or a mixture thereof; heating the interlayer 750 to drive water out of the interlayer 750; subjecting the interlayer 750 to repeated pump down and backfill cycles using clean dry air, $N_2$, $CO_2$, a noble gas; perform another suitable dehydration operation, or any combination thereof. In an embodiment, during a subsequent lamination operation, the workpiece, including the substrate 100 and the layers 122, 124, 126, 128, and 130, the interlayer 750, and a cover glass layer 610 can be placed into a chamber, so that the interlayer 750 is not exposed to air after dehydration.

During the lamination process, the interlayer 750 may flow. The relatively low moisture content in the interlayer 750 can allow for direct contact between the interlayer 750 and any one or more of the layers exposed within the void 400, which may include the upper transparent conductive layer 130, and lower transparent conductive layer 122, or any combination of layers between and including transparent conductive layers 122 and 130.

Figure 8:
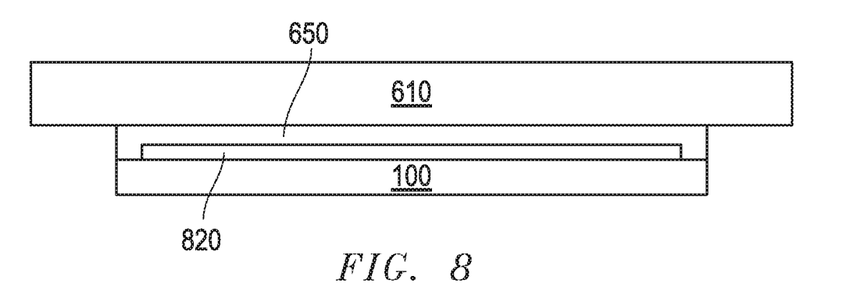
FIG. 8 includes an illustration of a side view of the workpiece of FIG. 6 after joining the workpiece to the cover glass substrate.
Figure 9:
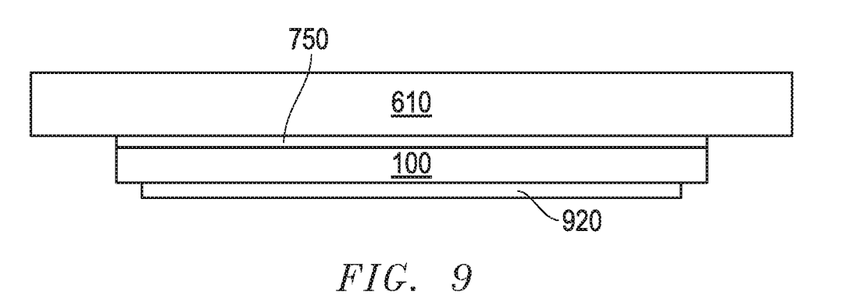
FIG. 9 includes an illustration of a side view of the workpiece of FIG. 7 after joining the workpiece to the cover glass substrate using an interlayer as described in accordance with an embodiment.

FIGS. 8 and 9 include side views of workpieces after being joined with cover glass substrates. FIG. 8 includes a layer 820 that represents the layers as seen in FIG. 5. The barrier layer 500 protects the layers exposed within the void 400. FIG. 9 includes an illustration with the relatively low moisture content interlayer 750. FIG. 9 further includes a layer 920 that represents the layers as seen in FIG. 4. The relatively low moisture content reduces the likelihood that an electrical short will form or that the device will prematurely fail. In alternative embodiments, the layer 920 and interlayer 750 can be used in place of the layer 820 and interlayer 650 in FIG. 8, and the layer 820 may be used in place of layer 920 in FIG. 9. When the barrier layer is present, either interlayer 650 or 750 may be used. When the barrier layer is not present, the interlayer 750 can be used.

Figure 10:
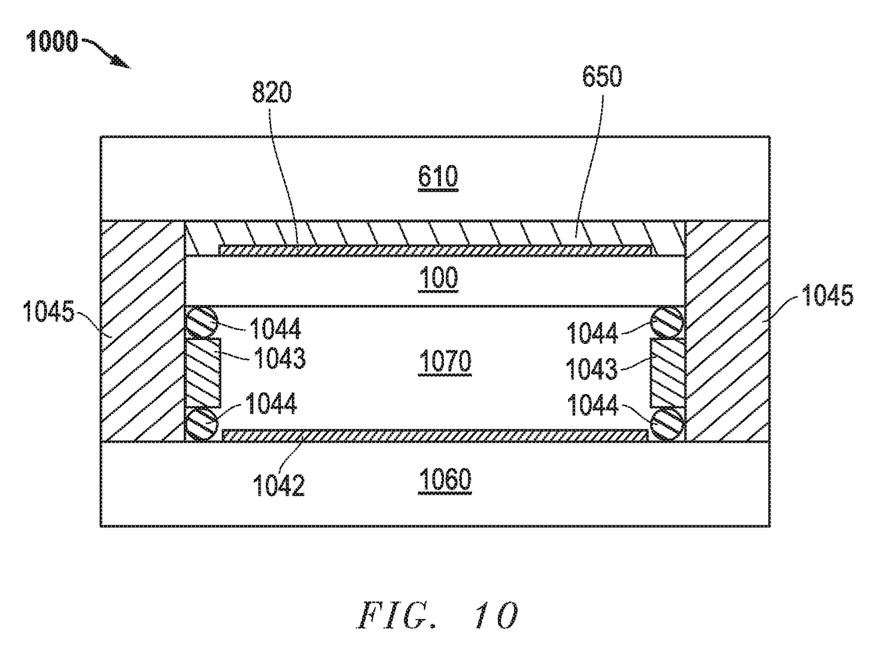
FIG. 10 includes an illustration of a cross-sectional view of an insulating glass unit in accordance with an embodiment.
Figure 11:
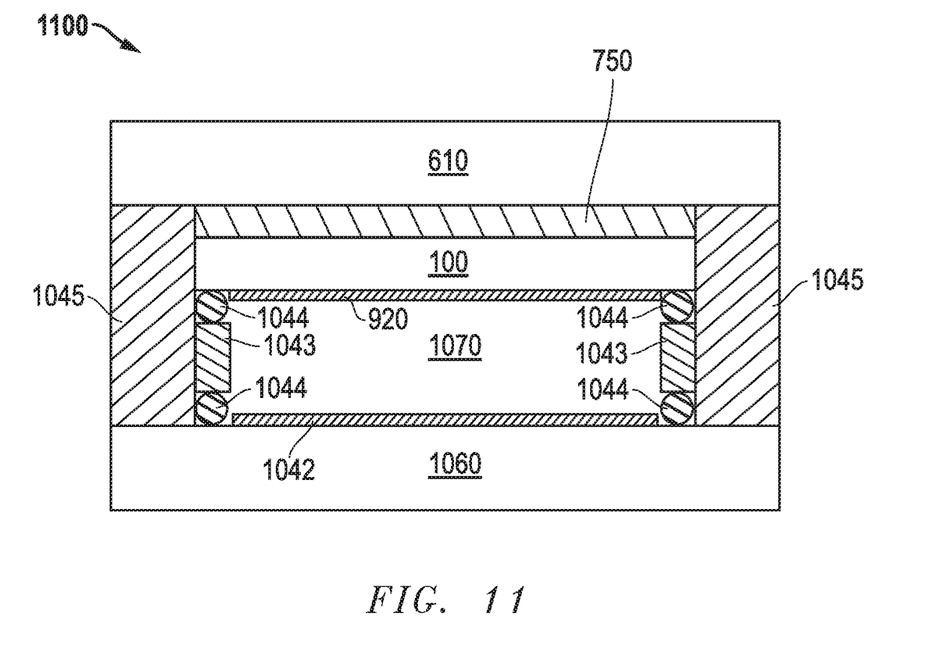
FIG. 11 includes an illustration of a cross-sectional view of an insulating glass unit in accordance with an alternative embodiment.

FIGS. 10 and 11 include illustrations of insulating glass units (IGUs) 1000 and 1100 based on the laminated structures in FIGS. 6 and 8, respectively. The laminated structures in FIGS. 7 and 9 could be used if desired in place of the laminated structures in FIGS. 6 and 8. Referring to FIG. 10, a pane 1060 can be coupled to the cover glass substrate 610. The pane 1060 can include any of the materials and thicknesses as described with respect to the cover glass substrate 610. In an embodiment, the cover glass substrate 610 and the pane 1060 can have the same composition or different compositions and can have the same thickness or different thicknesses. An optional low-emissivity layer 1042 can be disposed along an inner surface of the pane 1060.

The cover glass substrate 610 and pane 1060 can be spaced apart by a spacer bar 1043 that lies along a periphery of the IGU 1000. The spacer bar 1043 is coupled to the cover glass substrate 610 and pane 1060 via seals 1044. The seals 1044 can be a polymer, such as polyisobutylene. An adhesive joint 1045 is designed to hold the cover glass substrate 610 and the pane 1060 together and is disposed along the entire circumference of the edges of the cover glass substrate 610 and the pane 1060. An internal space 1070 of the IGU 1000 may include a relatively inert gas, such as a noble gas or dry air. In another embodiment, the internal space 1070 may be evacuated. Referring to FIG. 11, the IGU 1100 includes many of the same components as illustrated and discussed with respect to the IGU 1000; however, the orientation of the electrochromic substrate 100 is reversed, so that interlayer 750 contacts the electrochromic substrate 100 and cover glass substrate 610 but not the stack 920. In alternative embodiments, the layer 920 and interlayer 750 can be used in place of the layer 820 and interlayer 650 in FIG. 10, and the layer 820 may be used in place of layer 920 in FIG. 11. When the barrier layer is present, either interlayer 650 or 750 may be used. When the barrier layer is not present, the interlayer 750 can be used.

Embodiments as described herein have benefits over conventional devices. The barrier layer can be formed within a void or to seal off a void so that the likelihood of the interlayer making direct contact to layers within a void that is formed during or after depositing the set of layers that include the transparent conductive layers 122 and 130 and the electrochromic stack. The barrier layer can allow the use of a conventional interlayer. As an alternative, a relatively low moisture content interlayer can be used instead of a conventional interlayer. The relatively low moisture content can reduce the likelihood of forming an electrical short or premature failure as compared to a conventional interlayer. If needed or desired both a barrier layer and a relatively low moisture content interlayer may be used.

Many different aspects and embodiments are possible. Some of those aspects and embodiments are described below. After reading this specification, skilled artisans will appreciate that those aspects and embodiments are only illustrative and do not limit the scope of the present invention. Exemplary embodiments may be in accordance with any one or more of the ones as listed below.

Embodiment 1. A non-light-emitting, variable transmission device includes: a first substrate; a first transparent conductive layer overlying the first substrate; an electrochromic layer overlying the first transparent conductive layer; a second transparent conductive layer overlying the electrochromic layer; a second substrate; and an interlayer disposed between the first substrate and the second substrate, wherein the non-light-emitting, variable transmission device is configured such that a failure of the non-light-emitting, variable transmission device related to the interlayer is less likely than another non-light-emitting, variable transmission device in which the interlayer directly contacts the second transparent conductive layer and has a moisture content of at least 0.08 wt %.

Embodiment 2. The non-light emitting, variable transmission device of Embodiment 1, wherein: the interlayer has a moisture content of at most 0.05 wt %; or the non-light emitting, variable transmission device further includes a barrier layer disposed between the second transparent conductive layer and the interlayer, wherein the barrier layer extends at least partly through the second transparent conductive layer.

Embodiment 3. A non-light-emitting, variable transmission device including: a first substrate; a first transparent conductive layer overlying the first substrate; an electrochromic layer overlying the first transparent conductive layer; a second transparent conductive layer overlying the electrochromic layer; a second substrate; and an interlayer disposed between the first substrate and the second substrate, wherein: the interlayer has a moisture content of at most 0.05 wt %; or a barrier layer is disposed between the second transparent conductive layer and the interlayer, and the barrier layer extends at least partly through the second transparent conductive layer or overlies a passageway that extends at least partly through the second transparent conductive layer.

Embodiment 4. A process of fabricating a non-light-emitting, variable transmission device, the process including: forming a first transparent conductive layer overlying a first substrate; forming an electrochromic layer overlying the first transparent conductive layer; forming a second transparent conductive layer overlying the electrochromic layer; joining the first substrate and a second substrate using an interlayer disposed between the second conductive layer and the second substrate, wherein: the interlayer has a moisture content of at most 0.05 wt %; or the process further includes forming a barrier layer that extends at least partly through the second transparent conductive layer, wherein joining the first and second substrates is performed after forming the barrier layer.

Embodiment 5. The process of Embodiment 4, wherein after forming the second transparent conductive layer and before joining the first and second substrates, a void or a passageway extends at least through the second transparent conductive layer.

Embodiment 6. The process of Embodiment 4 or 5, further includes ejecting a particle that lies below the second transparent conductive layer, leaving a void or a passageway that extends at least through the second transparent conductive layer.

Embodiment 7. The process of Embodiment 6, further includes applying an electrical bias across terminals of the non-light-emitting, variable transmission device, wherein ejecting the particle occurs during or after applying the electrical bias.

Embodiment 8. The process of Embodiment 6, wherein ejecting the particle occurs before applying an electrical bias across terminals of the non-light-emitting, variable transmission device.

Embodiment 9. The process of any one of Embodiments 6 to 8, wherein forming an electrochromic stack includes introducing the particle over the substrate, and depositing a layer of the electrochromic stack over the particle.

Embodiment 10. The process of any one of Embodiments 6 to 9, wherein the first transparent conductive layer is exposed along a portion of the void or the passageway.

Embodiment 11. The process of any one of Embodiments 6 to 10, wherein forming the barrier layer is performed such that a portion of the barrier layer is formed within the void or formed within or seals off the passageway.

Embodiment 12. The process of any one of Embodiments 6 to 11, wherein forming the barrier layer is performed such that none of the first transparent conductive layer and electrochromic layer is exposed within the void or the passageway after forming the barrier layer.

Embodiment 13. The non-light emitting, variable transmission device or the process of any one of the preceding Embodiments, wherein an electrochromic stack includes: a first electrode layer that includes the electrochromic layer or an ion storage layer; an ion conductor layer; a second electrode layer that includes the other of the electrochromic layer or the ion storage layer, wherein: the ion conductor layer is disposed between the first and second electrode layers; the first transparent conductor layer is closer to the first electrode than to the second electrode; and the second transparent conductor layer is closer to the second electrode than to the first electrode.

Embodiment 14. The non-light emitting, variable transmission device or the process of any one of the preceding Embodiments, further includes an antireflective layer disposed between the second transparent conductive layer and the interlayer.

Embodiment 15. The non-light emitting, variable transmission device or the process of any one of the preceding Embodiments, wherein the interlayer has a moisture content of at most 0.05 wt %.

Embodiment 16. The non-light emitting, variable transmission device or the process of any one of the preceding Embodiments, wherein the interlayer contacts the first transparent conductive layer.

Embodiment 17. The non-light emitting, variable transmission device or the process of any one of Embodiments 13 to 16, wherein the interlayer contacts the first electrode layer.

Embodiment 18. The non-light emitting, variable transmission device or the process of any one of Embodiments 2 to 14, wherein the barrier layer is disposed between the second transparent conductive layer and the interlayer, and the barrier layer extends at least partly through the second transparent conductive layer.

Embodiment 19. The non-light-emitting, variable transmission device or the process of Embodiment 18, wherein the interlayer does not contact the first transparent conductor layer or the electrochromic layer.

Embodiment 20. The non-light-emitting, variable transmission device or the process of Embodiments 18 or 19, wherein the barrier layer includes an oxide, a nitride, or an oxynitride.

Embodiment 21. The non-light-emitting, variable transmission device or the process of Embodiments 18 or 19, wherein the barrier layer includes alternating films of an inorganic material and an organic material.

Embodiment 22. The non-light-emitting, variable transmission device or the process of any one of Embodiments 18 to 21, wherein the barrier layer has a thickness of at least 10 nm, at least 12 nm, or at least 15 nm.

Embodiment 23. The non-light-emitting, variable transmission device or the process of any one of Embodiments 18 to 22, wherein the barrier layer has a thickness of at most 90 nm, at most 70 nm, or at most 50 nm.

Embodiment 24. The non-light emitting, variable transmission device or the process of any one of Embodiments 2 to 15 and 18 to 23, wherein the barrier layer contacts the first transparent conductive layer.

Embodiment 25. The non-light emitting, variable transmission device or the process of any one of Embodiments 2 to 15 and 18 to 23, wherein the barrier layer contacts the first electrode layer.

Embodiment 26. The non-light emitting, variable transmission device or the process of any one of Embodiments 14, 15, and 18 to 25, wherein the antireflective layer is disposed between the second conductive layer and the barrier layer.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A non-light-emitting, variable transmission device comprising:
   a first substrate;
   a first transparent conductive layer overlying the first substrate;
   an electrochromic layer overlying the first transparent conductive layer;
   a second transparent conductive layer overlying the electrochromic layer;
   a second substrate;
   a barrier layer between the first substrate and the second substrate in contact with the second transparent conductive layer, wherein the barrier layer is disposed between the second transparent conductive layer and the interlayer, and the barrier layer extends at least partly through the second transparent conductive layer; and
   an interlayer disposed between the barrier layer and the second substrate,
   wherein the interlayer has a moisture content of at least 0.08 wt % and wherein the interlayer extends at least partly through the electrochromic layer.

2. The non-light emitting, variable transmission device of claim 1, wherein:
   the interlayer has a moisture content of at most 0.05 wt %.

3. A non-light-emitting, variable transmission device comprising:
   a first substrate;
   a first transparent conductive layer overlying the first substrate;
   an electrochromic layer overlying the first transparent conductive layer;
   a second transparent conductive layer overlying the electrochromic layer;
   a second substrate;
   a barrier layer in contact with the second transparent conductive layer; and
   an interlayer disposed between the barrier layer and the second substrate, wherein the interlayer extends at least partly through the electrochromic layer,
   wherein:
      the interlayer has a moisture content of at most 0.05 wt %; and
      the barrier layer is disposed between the second transparent conductive layer and the interlayer, and the barrier layer extends at least partly through the second transparent conductive layer or overlies a passageway that extends at least partly through the second transparent conductive layer.

4. The non-light emitting, variable transmission device of claim 3, further comprising an electrochromic stack, wherein the electrochromic stack comprises:
   a first electrode layer that includes the electrochromic layer or an ion storage layer;
   an ion conductor layer;
   a second electrode layer that includes the other of the electrochromic layer or the ion storage layer,
   wherein:
      the ion conductor layer is disposed between the first and second electrode layers;
      the first transparent conductor layer is closer to the first electrode than to the second electrode; and
      the second transparent conductor layer is closer to the second electrode than to the first electrode.

5. The non-light emitting, variable transmission device of claim 4, wherein the interlayer contacts the first transparent conductive layer.

6. The non-light-emitting, variable transmission device of claim 3, wherein the interlayer does not contact the first transparent conductor layer or the electrochromic layer.

7. The non-light-emitting, variable transmission device of claim 3, wherein the barrier layer includes an oxide, a nitride, or an oxynitride.

8. A process of fabricating a non-light-emitting, variable transmission device, the process comprising:
   forming a first transparent conductive layer overlying a first substrate;
   forming an electrochromic layer overlying the first transparent conductive layer;
   forming a second transparent conductive layer overlying the electrochromic layer;
   detecting a particle that is deposited below the second transparent conductive layer, wherein the particle is a contaminate, ejecting a particle that lies below the second transparent conductive layer, leaving a passageway that extends at least through the second transparent conductive layer; and
   joining the first substrate and a second substrate using an interlayer disposed between the second conductive layer and the second substrate, wherein the interlayer extends at least partly through the electrochromic layer, wherein:
      the interlayer has a moisture content of at most 0.05 wt %; and
      the process further comprises forming a barrier layer that extends at least partly through the second transparent conductive layer and is disposed between the second transparent conductive layer and the interlayer, wherein joining the first and second substrates is performed after forming the barrier layer.

9. The process of claim 8, wherein after forming the second transparent conductive layer and before joining the first and second substrates, a void or a passageway extends at least through the second transparent conductive layer.

10. The process of claim 8, wherein forming an electrochromic stack comprises:
    depositing a layer of the electrochromic stack over the particle, wherein the particle has been detected over the substrate.

11. The process of claim 10, wherein the first transparent conductive layer is exposed along a portion of the passageway.

12. The process of claim 8, wherein forming the barrier layer is performed such that a portion of the barrier layer is formed within or seals off the passageway.

13. The process of claim 8, further comprising an electrochromic stack, wherein the electrochromic stack comprises:
    a first electrode layer that includes the electrochromic layer or an ion storage layer;
    an ion conductor layer;
    a second electrode layer that includes the other of the electrochromic layer or the ion storage layer,
    wherein:
       the ion conductor layer is disposed between the first and second electrode layers;
       the first transparent conductor layer is closer to the first electrode than to the second electrode; and the second transparent conductor layer is closer to the second electrode than to the first electrode.

14. The process of claim 8, wherein the interlayer contacts the first transparent conductive layer.

15. The process of claim 8, wherein the interlayer does not contact the first transparent conductor layer or the electrochromic layer.

16. The process of claim 15, wherein the barrier layer includes an oxide, a nitride, or an oxynitride.

17. The process of claim 15, wherein the barrier layer includes alternating films of an inorganic material and an organic material.

\* \* \* \* \*

UNITED STATES PATENT AND TRADEMARK OFFICE
CERTIFICATE OF CORRECTION

| | | |
|---|---|---|
| PATENT NO. | : 11,567,384 B2 | Page 1 of 1 |
| APPLICATION NO. | : 16/192876 | |
| DATED | : January 31, 2023 | |
| INVENTOR(S) | : Wen Li et al. | |

It is certified that error appears in the above-identified patent and that said Letters Patent is hereby corrected as shown below:

In the Claims

Column 13, Line 19, Claim 1 please delete "conductive laver and", and insert --conductive layer and--

Signed and Sealed this
Eighteenth Day of June, 2024

Katherine Kelly Vidal
*Director of the United States Patent and Trademark Office*